March 29, 1966 A. PROVENZANO 3,242,957

SPLASH GUARD ATTACHMENT FOR MEAT GRINDER

Filed July 25, 1963

INVENTOR.

Anthony Provenzano

BY

*Learman, Learman and McCulloch*

United States Patent Office 3,242,957
Patented Mar. 29, 1966

3,242,957
SPLASH GUARD ATTACHMENT
FOR MEAT GRINDER
Anthony Provenzano, 1115 W. Genesee Ave.,
Saginaw, Mich.
Filed July 25, 1963, Ser. No. 297,643
18 Claims. (Cl. 146—1)

This invention relates to an apparatus for grinding meat and more particularly to an attachment adapted for removable connection to the discharge end of a meat grinder and which is particularly useful in preventing the spattering of objects adjacent the meat grinder or chopper.

The grinding of chunks of meat to form hamburger, ground steak and similar food products conventionally is accomplished in the meat departments of food stores with a motor driven grinding machine having a continuously rotating feed screw which engages meat chunks and feeds them toward the discharge end of the grinding machine. At the discharge end of the meat grinding machine is positioned a perforated die or plate through the perforations of which meat particles are forcibly extruded under the influence of the feed screw. At the inner surface of the die and in engagement with the latter is a number of cutting knives or blades which rotate with the screw for cutting the meat chunks from the extruded portions thereof so as to form short pieces of ground meat of substantially uniform size. The short pieces of meat that are cut from the meat chunks subsequently are pushed through the die orifices by the force of additional meat delivered to the die by the feed screw and the meat particles so ejected from the die usually fall by gravity into a container that is placed below the discharge end of the grinding machine.

The pieces or chunks of meat that are fed to the grinding machine generally are of irregular shape and size. As these pieces of meat are engaged by the feed screw and forcibly conveyed toward the extruding die, it is quite common for pockets of air to be trapped between chunks of meat, and the force exerted on the meat by the feed screw and the extruding die quite often causes the air in such pockets to be compressed to quite a high pressure. As the meat particles adjacent such air pockets are forced through the extruding die, the force exerted on such particles by the die suddenly is released, permitting the compressed air to expand suddenly and, in a sense, explosively. The sudden expansion of the compressed air quite often causes meat particles to be projected from the discharge end of the meat grinding machine with sufficient velocity to miss completely the receptacle in which they are adapted to be received. As a result, it is not uncommon for the objects and area surrounding the meat grinding apparatus to be littered with meat particles that have been forcibly ejected from the grinding machine.

The uncontrolled, forcible ejection of meat particles from a meat grinding machine is objectionable for several reasons. Firstly, the meat particles that miss the receiving receptacle are wasted, and in a busy market it is not uncommon for many hundreds of pounds of meat to be wasted each year by being lost in this manner. Secondly, the spattering of objects adjacent the grinding machine presents an untidy and unattractive appearance and, consequently, requires the expenditure of substantial time in cleaning the premises. Thirdly, the spattering of meat particles about the area of the grinding machine can create a safety hazard by rendering the footing around the machine unsure.

An object of this invention is to provide improved apparatus for use in conjunction with meat grinding machinery and which functions to prevent the spattering of objects and the area around the grinding machine with meat particles.

Another object of the invention is to provide an attachment for use in connection with meat grinders and which does not impede the flow of meat through the grinding machine.

A further object of the invention is to provide a meat grinding machine attachment of the kind referred to which permits the rapid grinding of meat particles so as to avoid undue heating of the meat by the grinding apparatus.

Another object of the invention is to provide a meat grinding machine attachment that requires no modification of the grinding machinery to accommodate the attachment and which is provided with self-contained mounting means.

Other objects and advantages of the invention will be pointed out specifically or will become apparent from the following description when it is considered in conjunction with the appended claims and the accompanying drawing in which:

Figure 1:
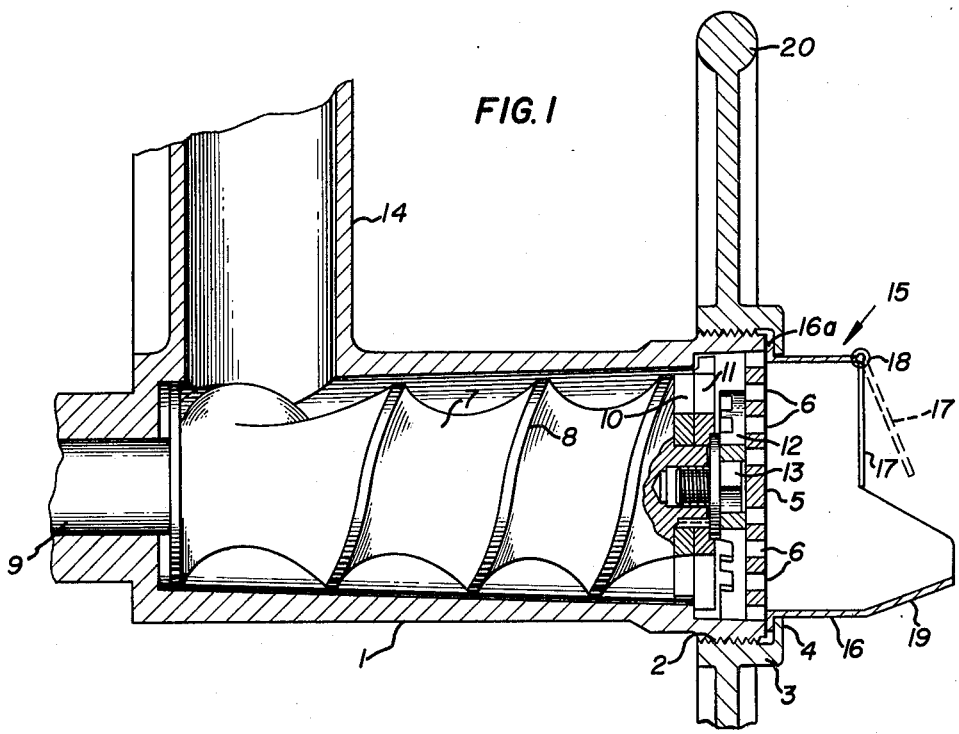
FIGURE 1 is a fragmentary, vertical sectional view of a commercial meat chopper of conventional design and equipped with an attachment constructed in accordance with the invention.

Apparatus constructed in accordance with the invention is adapted for use in conjunction with any one of a number of conventional meat chopper or grinder machines, one of which is disclosed in Patent No. 2,505,797. Such a machine usually comprises a base (not shown) on which is suitably fixed a cylindrical casing 1 that is open at one end for the discharge of meat. The open end of the casing may be exteriorly threaded as at 2 for the reception of a correspondingly threaded annular clamping ring 3 provided with a radial flange 4 that normally is adapted to bear against a disc or extrusion die 5 that is removably mounted within the open end of the casing and is provided with a plurality of spaced apart openings or perforations 6 through which particles of meat may be extruded.

Within the casing wall of the conventional grinder is rotatably mounted a feed screw or auger 7 provided with helical threads 8 that are so arranged as to engage chunks or pieces of meat and drive them toward the die 5. To one end of the screw 7 is joined a shank 9 that projects through an opening formed at the otherwise closed end of the casing 1. The shank may be coupled in any conventional manner to a driving electric motor (not shown). Adjacent to discharge end of the casing 1 the screw 7 is provided with a plurality of knives or cutters 10, 11 and 12 which removably may be fixed to the screw by a screw and washer assembly 13 in such manner that the knives rotate with the screw to distribute meat over the inner face of the die and to cut extruded particles from the chunks of meat, as is conventional.

Chunks of meat are introduced to the casing 1 through a hollow vertical sleeve or chute 14 that communicates with the interior of the casing 1. Meat pieces delivered to the interior of the casing are entrained by the threads or flights 8 of the screw and upon rotation of the latter are forcibly advanced toward the discharge end of the casing for extrusion through the die plate 5.

Figure 2:
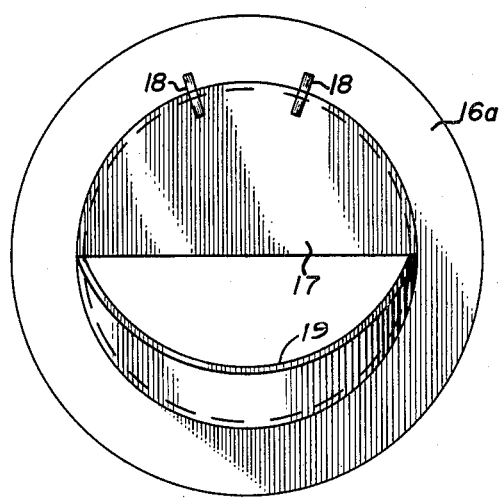
FIGURE 2 is a front elevational view of the attachment.
Figure 3:
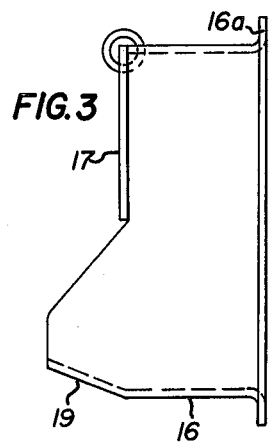
FIGURE 3 is a side elevational view of the attachment.

An anti-spatter attachment constructed in accordance with the invention is represented generally by the reference character 15 and comprises an annular sleeve portion 16 adapted to extend in prolongation of the casing 1. The sleeve preferably has a slightly smaller diameter than the diameter of the die plate 5, and terminates at one end in an annular, radially outwardly extending mounting flange 16a of such length as to be capable of being trapped between the die plate 5 and the flange 4 of the locking collar 3. Substantially one half the cross-sectional area of the cylindrical sleeve portion 16 is closed by a segment shaped deflecting plate 17 that is hingedly mounted on the sleeve 16 by a pair of rings 18 that pass through openings formed in the member 16 and in the plate 17. As is best indicated in FIGURE 2, the rings 18 are so arranged as to converge radially inwardly of the member 15 along substantially radial lines. The rings permit pivotal movement of the member 17 from a normal, substantially vertical position in a direction outwardly of the sleeve 16, as is indicated in dotted lines in FIGURE 2, but exert a light force on the member 17 tending always to resist such outward swinging movement.

Diametrically opposed to the deflection plate 17 the outer end of the sleeve portion 16 is provided with a flange or lip 19 that is substantially 180° in length and terminates on the diametrical line of the free edge of the deflecting plate 17. That is, the opposite ends of the lip terminate adjacent the plate 17. The lip 19 is inclined radially inwardly of the annular portion 16 and, as is best illustrated in FIGURE 2, the length that the lip 19 projects beyond the annular portion 16 progressively diminishes from the midpoint of the lip in directions toward its terminal ends. At its midpoint the lip 19 projects about three-fourths inch beyond the terminal end of the flange 16 and it is inclined to the cylindrical plane of the latter by about 20°. The inclination gradually and uniformly is reduced toward the opposite ends of the lip so that the opposite ends merge smoothly with the end of the cylindrical portion 16.

To assemble the attachment 15 with the grinding apparatus, the locking ring 3 is unthreaded from the casing, the manipulation of the ring 3 being facilitated by an annular hand wheel 20 which may be provided integrally with the ring if desired. Thereafter, the member 15 may be placed against the outer surface of the die plate 5 and the locking ring 3 slipped over the member 15 with the flange 4 bearing against the flange 16a. The member 15 then should be oriented in such manner that the deflecting plate 17 hangs perpendicularly. While maintaining the attachment 15 in such position, the locking ring may be threaded onto the casing 1 so as to clamp the attachment against the plate 5.

In operation, chunks of meat are introduced to the interior of the casing 1 through the chute 14 as the screw 7 is rotated. The chunks of meat are forcibly fed toward the discharge end of the casing and are cut and extruded through the orifices in the meat die plate 5. As the extruded pieces of meat pass through the die orifices, they are received within the chamber formed by the annular portion 16 inwardly of the lip and the plate 17, and move toward the discharge end of the attachment.

As is apparent from FIGURE 1, meat particles extruded through the die orifices are separated from one another by gaps, or voids, due to the spaces between the openings 6 in the die plate. Consequently, when such particles reach the outer end of the sleeve 16 and engage the deflection plate 17 and the lip 19, the latter elements may exert forces on the meat particles emerging from the chamber in the attachment 15 and deflect or compress the particles radially inwardly of the attachment so as to fill the voids between adjacent particles or strands of meat. This compaction or deflection of the meat particles forms a more or les solid wall of meat particles adjacent the free end of the attachment 15, but does not impede the progress of the meat through the attachment inasmuch as the shifting of the meat particles during their compaction is relatively unopposed because of the voids between adjacent meat particles. Moreover, should the accumulation of meat particles in the chamber rearwardly of the deflecting plate 17 begin to build up, the plate 17 may be swung outwardly by such meat particles so as to open wider the discharge end of the attachment.

The compaction of the meat particles passing through the attachment 15 into a substantially solid wall provides a barrier against which may impinge other particles of meat forcibly ejected through the die plate 5 upon sudden release of air pressure thereby avoiding spattering of objects in the area adjacent the discharge end of the grinder. Thus, previously ground meat itself forms a barrier to the uncontrolled discharge of the subsequently ground meat particles through the machine. However, since the compaction of the ground meat takes place outwardly of the die plate and is substantially unopposed, due to the presence of voids as aforesaid, the length of time that meat chunks remain in the casing 1 is substantially no different than would be the case if the attachment 15 were not provided. Accordingly, use of the attachment 15 does not thereby cause meat in the process of being ground to be heated any more than it ordinarily would be. Consequently, the use of deflecting apparatus constructed in accordance with the invention does not result in objectionable heating of the meat being ground and there is, therefore, no objectionable color change of the ground meat.

Following the grinding of a desired quantity of meat, the locking ring 3 may be removed, as is conventional, so as to permit the die plate 5 and the knives to be cleaned in the usual manner. Removal of the clamping ring 3 will result in removal of the attachment 15 at the same time, thereby permitting the latter to be cleaned without requiring the operation of any additional mounting or fastening devices.

The disclosed embodiment is representative of a presently preferred form of the invention, but is intended to be illustrative rather than definitive thereof. The invention is defined in the claims.

I claim:

1. An attachment for a meat grinder of the like comprising an annular sleeve portion having an open, outer end; a flat, segment shaped deflector member of such size as to overlie substantially one-half of the cross-sectional area of said sleeve portion; and means hinging said deflector member to said sleeve portion at said one end of the latter for unrestricted swinging movement of said deflector member, whereby said deflector member is capable of swinging freely from and to a normal position in which it closes substantially one-half of said sleeve portion.

2. An attachment for a meat grinder or the like comprising an annular sleeve portion having open inner and outer ends; mounting means on said sleeve portion at one end of the latter; a flat, segment shaped deflector member of such size as to overlie substantially one-half of the cross-sectional area of said sleeve portion; and means hinging said deflector member to said sleeve portion at said outer end of the latter for unrestricted swinging movement of said deflector member, whereby said deflector member is capable of swinging freely from and to a normal position which closes substantially one-half of the outer end of said sleeve portion.

3. An attachment for a meat grinder or the like comprising an annular sleeve portion; and an arcuate lip member extending from one end of said sleeve portion and being inclined radially inwardly thereof, the length that said lip member projects beyond said one end of said sleeve portion decreasing toward each end of said lip member.

4. The attachment set forth in claim 3 including mounting means on the other end of said sleeve portion for mounting the latter on said grinder.

5. An attachment for a meat grinder or the like comprising an annular sleeve portion; and an arcuate lip member extending from one end of said sleeve portion and being inclined radially inwardly thereof, the inclination of said lip member decreasing toward the ends of the latter so that the ends of said lip member merge smoothly with said one end of said sleeve portion.

6. The attachment set forth in claim 5 including mounting means on the other end of said sleeve portion for mounting the latter on said grinder.

7. An attachment for a meat grinder or the like comprising an annular sleeve portion; a flat, segment shaped deflector member of such size as to overlie substantially one-half the cross-sectional area of said sleeve portion; means hinging said deflector member to said annular portion adjacent one end of the later, and a substantially semi-circular lip member extending from said one end of sleeve portion and being inclined radially inwardly of the latter, the ends of said lip member terminating adjacent said deflector member.

8. The attachment set forth in claim 7 wherein the inclination of said lip member decreases toward its ends.

9. The attachment set forth in claim 7 wherein the length that said lip member projects beyond said one end of said sleeve portion decreases toward the ends of said lip member.

10. The attachment set forth in claim 7 including mounting means at the other end of said sleeve portion for mounting the latter on said grinder.

11. The attachment set forth in claim 10 wherein said mounting means comprises a flange extending radially of said sleeve portion.

12. The attachment set forth in claim 7 wherein the inclination of said lip member and the length that the latter projects beyond said one end of said sleeve portion respectively decrease in a direction toward the ends of said lip member.

13. In a meat grinder or the like comprising a casing having an open end, a perforated die plate mounted in said casing adjacent said open end, means in said casing for extruding meat through the perforations in said die plate, and means supported by said casing for mounting said die plate therein, the combination of an attachment comprising an annular sleeve portion; mounting means at one end of said sleeve portion mounting the latter in said casing in prolongation of the latter and in such positions as to receive meat extruded through the perforations in said die plate; a semicircular deflector member swingably mounted on said sleeve portion adjacent the other end of the latter and swingable from and to a normal, substantially vertical position; and a semi-circular lip member extending beyond said other end of said sleeve portion and being inclined radially inwardly of the latter, the opposite ends of said lip member terminating adjacent said deflector member.

14. The combination set forth in claim 13 wherein the mounting means for said deflector member comprise a pair of rings converging substantially radially of said sleeve portion.

15. The combination set forth in claim 13 wherein the length that said lip member projects beyond said other end of said sleeve portion decreases toward the ends of said lip member.

16. The combination set forth in claim 13 wherein the inclination of said lip member decreases toward the ends thereof.

17. The combination set forth in claim 13 wherein the length that said lip member projects beyond said other end of said sleeve portion and the inclination of said lip member respectively decrease toward the ends of said lip member.

18. The combination set forth in claim 13 wherein the mounting means for said sleeve portion comprises a radially extending flange at said one end of said sleeve portion and separably secured to said casing by said die plate mounting means.

References Cited by the Examiner

UNITED STATES PATENTS

| 1,099,339 | 6/1914 | Claude | 130—6 |
| 1,160,955 | 11/1915 | Peoples et al. | 146—189 |
| 1,257,559 | 2/1918 | Webb | 100—42 |
| 1,289,765 | 12/1918 | Hood | 146—182.1 |
| 1,675,809 | 7/1928 | Knowlton | 146—182.2 |
| 2,576,784 | 11/1951 | Dodds et al. | |
| 2,751,950 | 6/1956 | Scott | 146—182 |
| 2,859,688 | 11/1958 | Nolt | 100—42 |

FOREIGN PATENTS

| 1,287,354 | 2/1962 | France. |
| 419,544 | 10/1925 | Germany. |

ROBERT C. RIORDON, *Primary Examiner.*

J. SPENCER OVERHOLSER, *Examiner.*

W. G. ABERCROMBIE, *Assistant Examiner.*